May 15, 1962

C. E. SLOOP 3,035,242

METER SOCKET BY-PASS

Filed March 31, 1958

INVENTOR:
CLIFFORD E. SLOOP

BY: *Ernest T. Kerston*

ATTORNEY

May 15, 1962

C. E. SLOOP 3,035,242

METER SOCKET BY-PASS

Filed March 31, 1958

INVENTOR:
CLIFFORD E. SLOOP

BY:

ATTORNEY

May 15, 1962 C. E. SLOOP 3,035,242
METER SOCKET BY-PASS
Filed March 31, 1958 3 Sheets-Sheet 3

INVENTOR:
CLIFFORD E. SLOOP.
BY:
ATTORNEY 3,035,242
METER SOCKET BY-PASS
Clifford E. Sloop, 2230 10th St., Columbus, Ga.
Filed Mar. 31, 1958, Ser. No. 725,364
4 Claims. (Cl. 339—19)

This invention relates to a meter socket having a built in by-pass, and more particularly concerns a novel by-pass for rectangular, self-contained meter sockets.

The well known advantages of socket-type meter installations for both watt-hour and demand meters have resulted in their extensive commercial use. In accordance with the usual practice, however, when such a meter is removed from its supporting base receptacle or socket, the circuit to the consumer's outlets is broken because the meter itself constitutes the electrical connection between the supply line and the load circuit. It can be seen, therefore, that the meter cannot be tested, changed, nor the connections inspected without the customer's service being interrupted. Such interruptions, however temporary, are always viewed with displeasure, and often result in considerable inconvenience.

While it is recognized that meter by-pass arrangements have been proposed in the past in an effort to overcome these problems, such proposals have not met with complete acceptance by the utilities. Among the various reasons for this is that many prior art meter by-pass arrangements require a new socket installation, the design of the by-pass being such that it is not readily adaptable to existing installations. In addition, many prior art solutions require a considerably longer socket than conveniently used, resulting in reluctance on the part of utilities to apply them to new installations, and often precluding their use in existing installations. Another prior art construction requires that shorting elements be inserted from the sides of the box, necessitating free wall space around the socket which, of course, is often not available. Other forms of prior art include arrangements having springs with associated moving parts which, of course, effect a substantial reduction in reliability.

One of the objects of my invention, therefore, is to provide a novel and improved meter socket of conventional size with a built-in by-pass which can be actuated from the front of the socket, thereby allowing its use without the provision of additional wall space therearound for manipulation of shorting tools.

Another object of my invention is to provide a novel meter socket by-pass which may be installed in the unused portion of a conventional meter socket of generally rectangular configuration and is therefore readily applicable to pre-existing meter socket installations.

A further object of my invention is to provide a novel and improved meter socket by-pass arrangement which is safety engineered so as to insure that all conducting parts are enclosed or protected by insulating material prior to energization thereof.

Still another object of my invention is to provide a novel and improved by-pass which is a rigid assembly having no springs or moving metal parts to impair reliability, and which is constructed to be free standing when its lead wires are attached.

A still further object of my invention is to provide a by-pass arrangement in which completion of the by-pass is effected by a wiping action so as to provide for self-cleaning of the contacting surfaces for maximum electrical continuity.

My invention also includes as an objective that of providing a novel and improved meter by-pass which is rugged, yet simple in construction, and which lends itself readily to the demands of economic manufacture.

Numerous other objects, features and advantages of my invention will be apparent from consideration of the following description, taken in conjunction with the accompanying drawings, wherein like reference characters refer to the same or similar parts throughout the several views, and in which.

Figure 1:
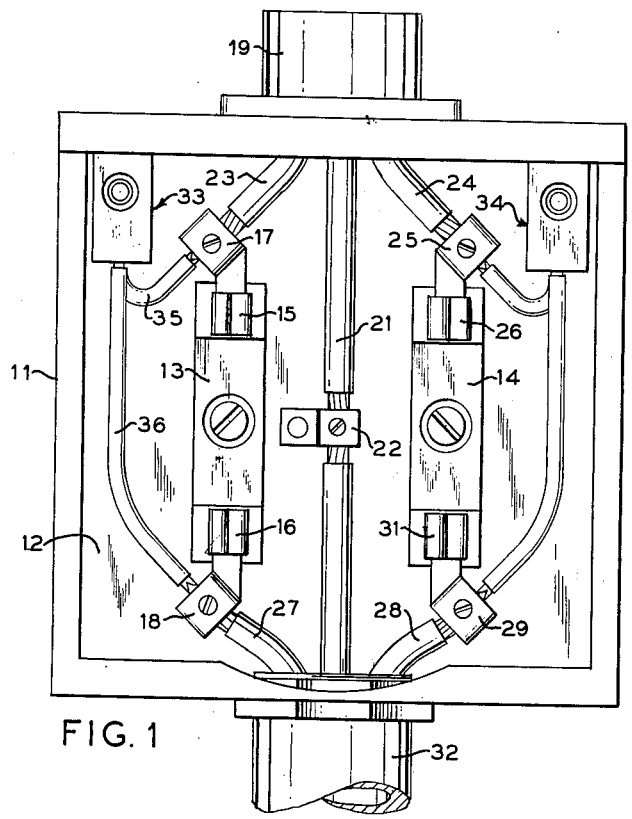
FIG. 1 is a front elevational view illustrating a square ringless-type meter socket provided with a by-pass arrangement according to the present invention.

Referring now more particularly to the drawings, FIG. 1 illustrates a conventional ringless meter socket provided with a by-pass arrangement according to the present invention. The socket generally comprises a rectangular box 11 having a back or base plate 12 which supports a pair of elongate terminal blocks 13 and 14 made of porcelain or other suitable insulating material. Each insulating block is provided with a set of resilient contact jaws, as at 15 and 16, one disposed at each end thereof and having terminal clamps 17 and 18, respectively, electrically connected therewith.

The meter socket, shown here by way of illustration, is adapted for use in a three wire, single phase, secondary distribution system. Three input or supply lines to the socket pass through the conduit hub 19 in the top of the box 11. The ground or common line 21 passes directly through the box, being electrically connected thereto as by clamp 22 so as to put the box at ground potential for safety purposes in compliance with the various wiring codes; however, the "hot" lines, such as lines 23 and 24, are held securely at the uninsulated ends thereof in the clamps 17 and 25 for electrical connection with the contact jaws 15 and 26 respectively. Output or load lines 27 and 28 are held securely at the uninsulated ends thereof by the terminal clamps 18 and 29 for electrical connection to the meter contact jaws 16 and 31. The outgoing lines, including ground line 21, pass through an aperture in bottom wall of the box 11 into a suitably secured conduit 32.

The contact jaws at each end of the spaced terminal blocks are adapted to receive contactor blades at the rear of a meter when the meter is inserted or plugged into the socket, as hereinafter described with reference to FIG. 6. It will be appreciated, however, that the meter itself constitutes the electrical connection between the input and output lines. Accordingly, when the meter is in the socket, the circuit would be traced from the contact jaw 15 through the meter to the contact jaw 16. In like manner, the circuit from the contact jaw 26 would be traced through the meter to the jaw 31.

Figure 3:
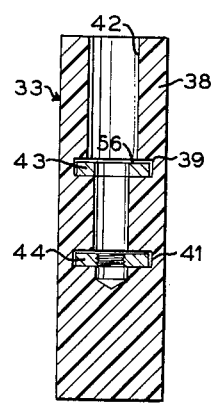
FIG. 3 is a cross sectional view of the by-pass block of my invention taken along the line 3—3 of FIG. 2.
Figure 2:
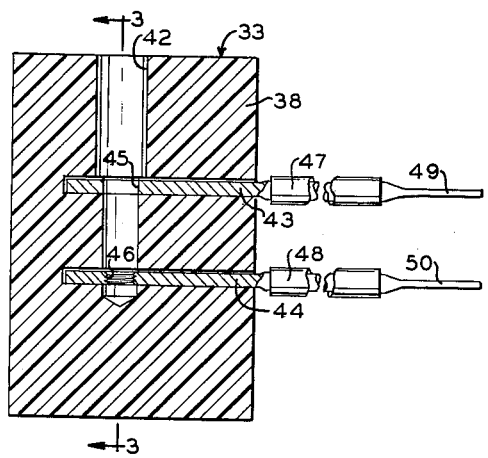
FIG. 2 is a central longitudinal cross sectional view of the by-pass block according to my invention.

From the construction as thus far described defining a generally conventional meter socket, it will readily be appreciated that once a meter is in operation in such an installation it cannot be changed, tested, nor the connections inspected without the customer's service being interrupted. To overcome this problem, I have provided a meter by-pass arrangement structurally and functionally interrelated with the socket construction. In the present form of the invention here presented by way of illustration, by-pass blocks 33 and 34, hereinafter described in detail with respect to FIGS. 2 and 3, are provided in the unused interior portions of the socket box. In this arrangement it can be seen that by-pass block 33 is disposed in the upper left hand corner of the socket and is provided with leads 35 and 36 which are secured in terminal clamps 17 and 18, for electrical connection with contact jaws 15 and 16, respectively.

It will be appreciated that for application to pre-existing installations the by-pass blocks may be advantageously supported in position by their leads. In this construction it has been found that the mass and construction of the by-pass block 33 is such as compared to the heaviness of the leads 35 and 36 as to make additional supporting means unnecessary; however, it will be recognized that in the manufacture of meter sockets including the by-pass arrangement of the present invention, it may be expedient to suitably secure each by-pass block to the walls or back of the socket as by bolts or clamps, but such securement is not necessary, and the free standing feature of my invention is a real advantage.

As shown in FIGS. 2 and 3, the by-pass block according to my invention is herein contemplated to take the form of a solid rectangular member 38 of plastic, synthetic rubber, or other suitable insulating material, having a pair of spaced parallel slots 39 and 41 formed therein. At right angles to these slots and slightly inwardly of their termination is a circular hole or bore 42 concluding slightly below the lower slot. That portion of hole 42 extending between the upper slot and the outside periphery of the block is of somewhat larger diameter than that portion below the upper slot and may therefore be considered as a counterbore. Adapted for insertion in the upper and lower slots are upper and lower contactor plates 43 and 44, respectively, made of copper or other highly conductive metal. Formed through the upper contactor plate 43 at its intersection with the hole 42 is a plain circular aperture 45 of substantially the same diameter as the lower bore. In like manner, formed in the lower contactor plate at its intersection with the hole is a threaded aperture 46, coaxial with, but of smaller diameter than, the aperture in the upper contactor plate. Threaded aperture 46 is adapted for registration with the threaded end portion of a shorting jumper hereinafter described with respect to FIG. 4. From this construction it will be appreciated that the by-pass block with the contactor plates therein forms a rigid assembly having no springs or moving metal parts to impair reliability.

Welded, brazed, soldered, or otherwise suitably secured both electrically and mechanically to upper and lower contactor plates 43 and 44 are a pair of insulated leads 47 and 48 which terminate in flattened end portions or lugs 49 and 50 that are adapted to be mechanically and electrically connected to terminal clamps, as at 17 and 18, associated with each set of contact jaws, as at 15 and 16, in the meter socket.

Figure 4:
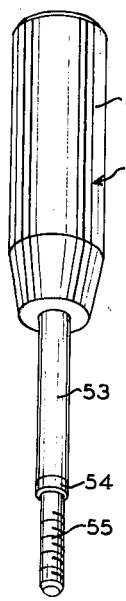
FIG. 4 is a perspective view illustrating the shorting tool or jumper of my invention.

Referring now particularly to FIG. 4, it is herein contemplated that the shorting jumper 51 take the form therein shown which is characterized by having an insulated handle portion 52, an insulated shank portion 53 extending therefrom, a contactor collar 54 terminating said insulated shank portion, and a threaded shank or screw portion 55 extending below said contactor collar. From the standpoint of construction, however, it will be recognized that the jumper might be formed from an elongate shank which is threaded at one end, enclosed in an insulating handle at the other end, and covered with an insulating sleeve in the middle portion thereof. The contactor collar, of course, could be formed on the shank, or otherwise suitably secured thereto as by welding. It is herein contemplated that the outside diameters of the collar and sleeve be substantially the same, and that of the threaded end portion of the shank be substantially smaller than the collar so that the collar and threaded end portion together could be considered as a bolt having a round head.

With the construction thus far described, it should be apparent that when the jumper 51 is inserted into the hole 42 of the by-pass block the threaded portion thereof will extend through the plane aperture 45 in the upper contactor plate and will be adapted to be threaded through the aperture 46 in the lower contactor plate. The rotary engagement of the collar 54 with the exposed annular shoulder 56 of the upper contactor plate effects a wiping action which provides for self-cleaning of the contacting surfaces. The resulting bolt-like engagement is further characterized by the upper and lower contactor plates being forced inwardly, by the conductive end portion of the jumper, against the middle portion of the insulator block so as to insure a good mechanical and electrical coupling through the by-pass.

It will be recognized, of course, that no arcing occurs during the insertion of the jumpers into the by-pass blocks since the only potential difference across the contactor plates is equal to the voltage drop across the meter, which is quite small, usually less than a volt. It is also to be noted that when the by-pass block is supported by its leads, the arrangement would be of sufficient rigidity to preclude movement of the block by the rotational torque applied through the shorting jumper in bolting the contactor plates together.

As a further feature of my invention the construction is such that upon insertion of the shorting jumper into the hole of the by-pass block, the collar will be received into the counterbore portion thereof before the threaded end of the jumper can contact the upper contactor plate. This is a highly desirable feature since otherwise it would be possible for conductive portions of the jumper to short-circuit the energized upper contactor plate to the grounded socket box or through the operator to ground. It will be appreciated from this arrangement that not only is the by-pass precluded from inadvertent operation; but also, the operator is protected from accidental shock by the complete enclosure of all conductive parts prior to energization thereof.

Figure 5:
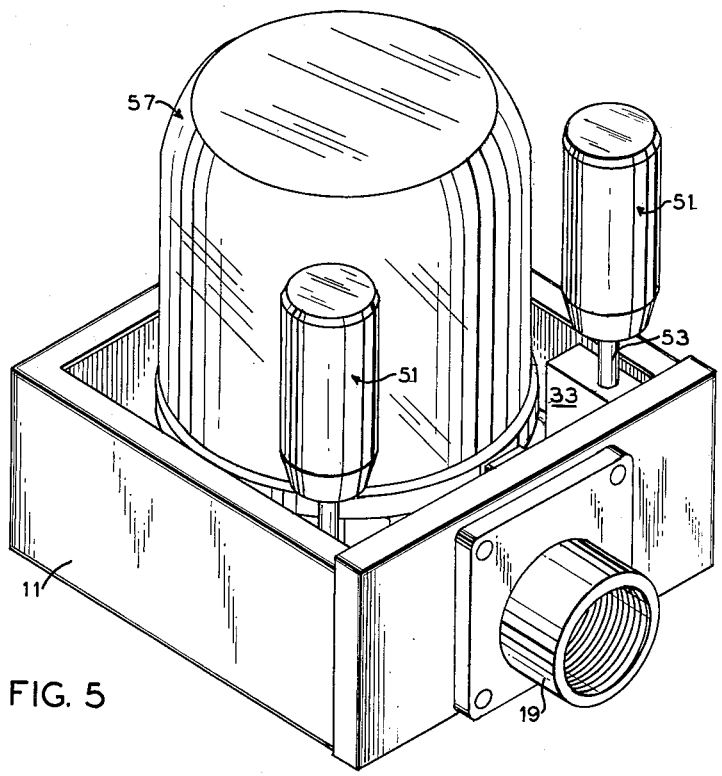
FIG. 5 is a perspective view of the meter socket of FIG. 2 with a meter therein and by-passed with the shorting arrangement as taught according to my invention.

From the construction thus far described, it will be apparent that when the meter casing 57 is placed into operative position upon a meter socket, as shown in FIG. 5, four projecting contact blades (not shown) on the back thereof will come into operative mechanical and electrical engagement with the jaws mounted on the terminal blocks in the meter socket, thereby completing the circuit from the supply lines to the load and providing a means whereby the energy consumed may be measured. However, when it becomes necessary either to change the meter, test the meter, or to inspect its connections, rather than interrupt the continuity of service by removal of the meter without a by-pass, shorting jumpers 51 may be inserted into the by-pass blocks 33 and 34 according to my invention, whereupon the meter 57 may be removed for such services as are required without interruption of electrical power to the consumer.

In accordance with the invention as applied to one conventional form or ringless meter socket shown in FIG. 5, the meter is locked in the socket by a front cover plate (not shown) having a large aperture therein through which the meter casing projects. In the use of the present invention with this type of socket, therefore, it is necessary to first remove the front cover, whereupon the shorting jumpers may be inserted in the by-pass blocks, as heretofore described, and the meter thereafter removed.

Figure 6:
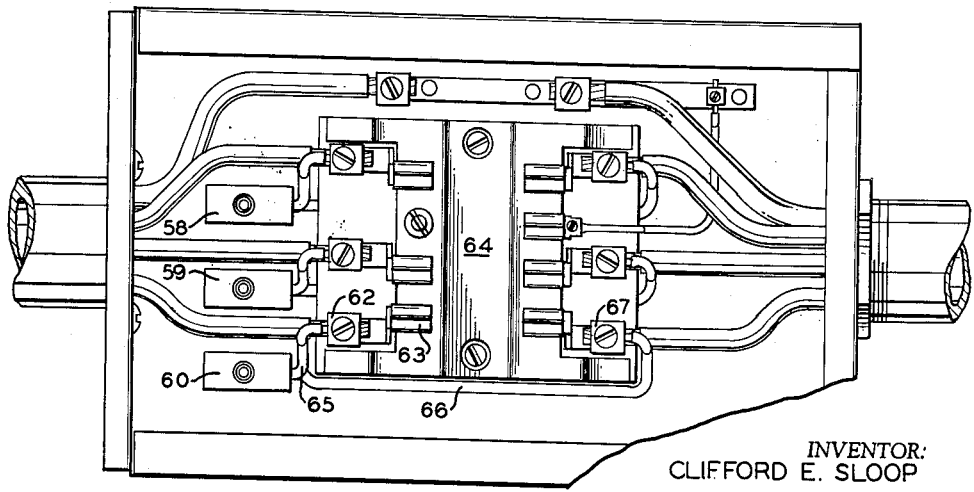
FIG. 6 is a front elevational view illustrating the by-pass arrangement according to my invention as applied to a four-wire meter socket.

As shown in FIG. 6, the by-pass blocks according to my invention are readily applicable to three phase, three or four wire meter socket installations. As herein shown, the by-pass blocks 58, 59, and 60 may be provided adjacent the terminal clamps, as at 62, associated with each contact jaw, as at 63, on one side of the central terminal block 64 on which the jaws are mounted. As shown with respect to by-pass block 60, a short lead 65 may then connect directly to adjacent terminal clamp 62 of jaw 63 while the longer lead 66 may extend under, through, or alongside the block to the terminal clamp 67 adjacent the complementary terminal jaw.

Figure 7:
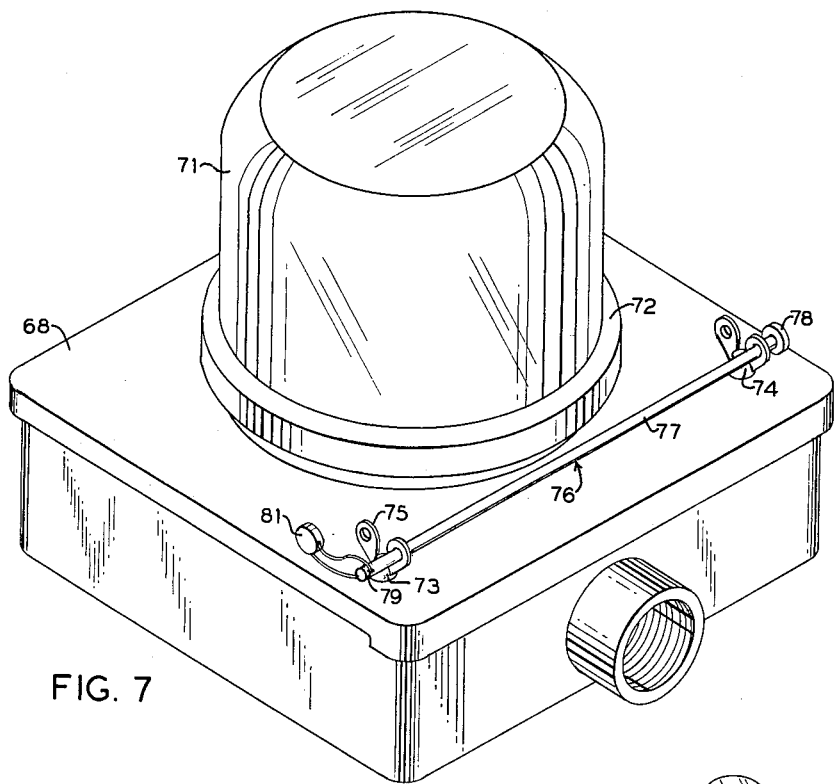
FIG. 7 is a perspective view of another embodiment of my invention wherein a ring-type meter socket is utilized.
Figure 8:
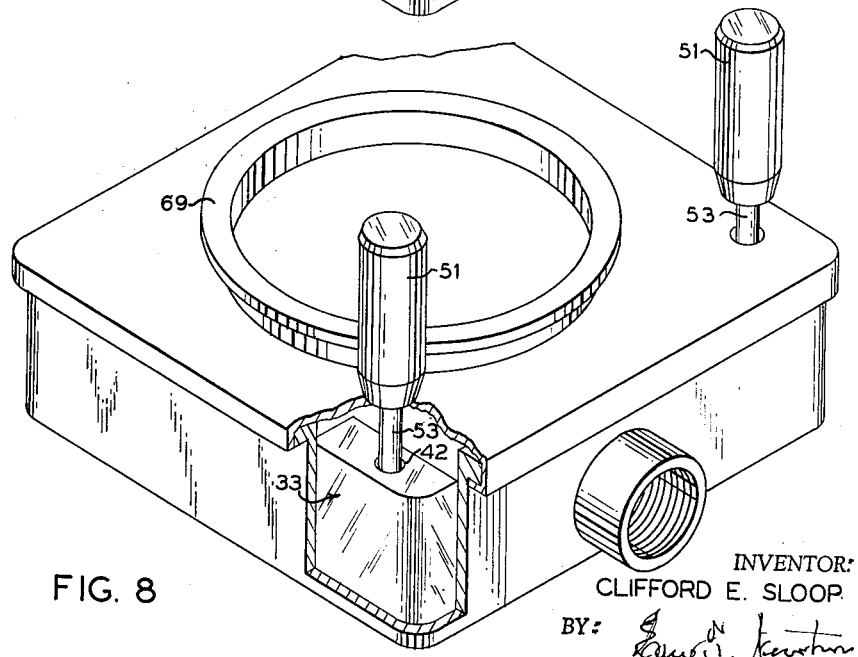
FIG. 8 is a perspective view of the meter socket of FIG. 7 by-passed according to my invention and with the meter removed therefrom.

FIGS. 7 and 8 show an embodiment of the invention as applied to a ring-type meter socket. In this form of construction, the socket cover plate 68 is provided with an annular flange 69 about the periphery of the meter casing aperture. The meter 71 is then adapted to be inserted through the aperture for engagement of the contact blades (not shown) on the back thereof with the socket jaws, such insertion being limited by an annular flange (not shown) about the meter base which abuts the cover plate flange 69. A removable, U-channel, annular clamp 72 encompasses the cover and meter flanges so as to secure the meter in the socket.

As shown in FIG. 7, the socket cover 68 is provided with a pair of removable screw plugs 73 and 74 which are disposed directly above the jumper receiving bore in each by-pass block. In the construction here presented by way of illustration, each screw plug is formed with a winged top portion 75 to provide for manual threading of the plug into the cover plate. Formed through each wing is a circular aperture adapted to receive a locking bar 76 which may be generally defined as having an elongate cylindrical shank 77 with a head 78 at one end thereof and a diametrically formed hole 79 through the other end. The bar 76 is adapted to be inserted through one of the wing apertures in each screw plug, and to be secured in such position by the wire seal arrangement 81.

Upon removal of the locking bar 76, the winged screw plugs 73 and 74 may be threaded out of the socket cover plate 68 exposing the by-pass blocks therebelow, whereupon the shorting jumpers 51 of my invention may be inserted therein to effect an electrical by-pass of the meter. The meter may then be withdrawn directly through the socket cover without causing an interruption of power.

From the foregoing, it will be apparent that I have provided a novel meter by-pass arrangement which is well adapted to fulfill the aforestated objects of the invention. Moreover, whereas the invention has been disclosed in detail with respect to embodiments thereof which give satisfactory results, it will be understood by those skilled in the art to which the invention most nearly appertains, that additional embodiments and modifications thereof may be provided without departing from the spirit or scope of the invention as defined by the appended claims.

I claim:

1. In an electric meter box of the type having a base with an insulating terminal means mounted in the box on said base, a pair of contact jaws mounted on said means for receiving the contact blades of an electrical meter with a base slightly smaller than the width of said box removably mounted on said box, and an opposed pair of terminal clamps electrically connected to said pair of said contact jaws through which current from a cable connected to one of said terminal clamps flows via said meter to a cable connected to the other of said terminal clamps, the combination therewith of a pair of wire leads connected respectively to said terminal clamps and a by-pass block within the corner of said box clear of the meter and meter base, said by-pass block including a pair of spaced contact plates respectively connected to said wire leads, an insulating block surrounding said spaced plates, there being provided aligned holes in said insulating block and said plates, the hole of one of said plates being provided with internal threads for receiving a screw portion of a shorting jumper to urge a contact collar on said shorting jumper against the other of said plates when said shorting jumper is rotated.

2. In an electric meter box of the type having a base with an insulating terminal means mounted in the box on said base, a pair of contact jaws mounted on said means for receiving the contact blades of an electrical meter removably mounted on said box, and an opposed pair of terminal clamps electrically connected to said pair of said contact jaws through which current from a cable connected to one of said terminal clamps flows via said meter to a cable connected to the other of said terminal clamps, the combination therewith of a pair of wire leads connected respectively to said terminal clamps and a by-pass block carried by said wire leads within said box and in a floating condition with respect to said box, said by-pass block including a pair of spaced contact plates respectively connected to said wire leads, an insulating block surrounding said spaced plates, there being provided aligned holes in said insulating block and said plates, the hole of one of said plates being provided with internal threads for receiving a screw portion of a shorting jumper to urge a contact collar on said shorting jumper against the other of said plates when said shorting jumper is rotated.

3. In an electric meter box of the type having a base with an insulating terminal means mounted in the box on said base, a cover, a pair of contact jaws mounted on said means for receiving the contact blades of an electrical meter removably mounted on said box and projecting through said cover, and an opposed pair of terminal clamps electrically connected to said pair of said contact jaws through which current from a cable connected to one of said terminal clamps flows via said meter to a cable connected to the other of said terminal clamps, the combination therewith of a pair of wire leads connected respectively to said terminal clamps and a by-pass block within said box, said by-pass block including a pair of spaced contact plates respectively connected to said wire leads, an insulating block surrounding said spaced plates, there being provided aligned holes in said insulating block and said plates, the hole of one of said plates being provided with internal threads for receiving a screw portion of a shorting jumper to urge a contact collar on said shorting jumper against the other of said plates when said shorting jumper is rotated, there being provided a hole in said cover spaced from said meter and aligned with said aligned holes, the axis of the aforesaid aligned holes being spaced from the meter sufficiently to permit insertion of said jumper into said holes when said meter is installed on said box.

4. In an electric meter box of the type having a base with an insulating terminal means mounted in the box on said base, a pair of contact jaws mounted on said means for receiving the contact blades of an electrical meter removably mounted on said box, and an opposed pair of terminal clamps electrically connected to said pair of said contact jaws through which current from a cable connected to one of said terminal clamps flows via said meter to a cable connected to the other of said terminal clamps, the combination therewith of a pair of wire leads connected respectively to said terminal clamps and a by-pass block carried by said wire leads within said box and in a floating condition with respect to said box, said by-pass block including a pair of spaced contact plates respectively connected to said wire leads, an insulating block surrounding said spaced plates, there being provided aligned holes in said insulating block and said plates, the hole of one of said plates being provided with internal threads, and a shorting jumper having a screw portion and a collar for urging against the other of said plates when said screw portion is received in said hole of one of said plates.

References Cited in the file of this patent

UNITED STATES PATENTS

Re. 11,970    Greil et al. _____ Feb. 18, 1902
90,270    Jones _____ May 18, 1869

(Other references on following page)

UNITED STATES PATENTS

| | | |
|---|---|---|
| 252,395 | Odell | Jan. 17, 1882 |
| 260,067 | Vail | June 27, 1882 |
| 644,844 | Bunnell | Mar. 6, 1900 |
| 1,169,099 | Wilcox et al. | Jan. 18, 1916 |
| 2,145,557 | Rypinski | Jan. 31, 1939 |
| 2,226,148 | Taylor | Dec. 24, 1940 |
| 2,231,737 | Rutter | Feb. 11, 1941 |
| 2,613,287 | Geiger | Oct. 7, 1952 |
| 2,782,387 | Coleman | Feb. 19, 1957 |
| 2,825,879 | Moore | Mar. 4, 1958 |

OTHER REFERENCES

Electric World, page 56, Jan. 6, 1958.